E. A. VANDENBURGH.
FRUIT JAR HOLDER.
APPLICATION FILED SEPT. 14, 1909.
955,231.
Patented Apr. 19, 1910.
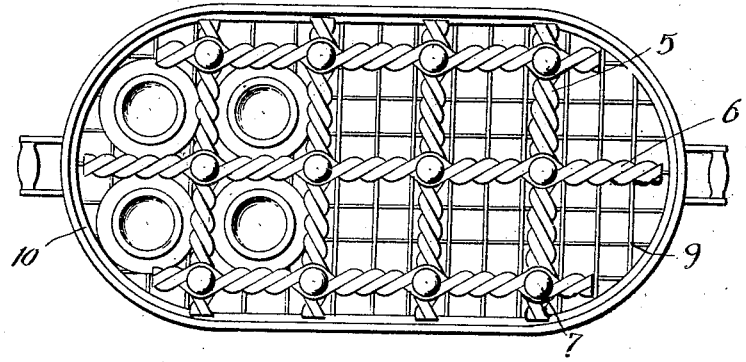
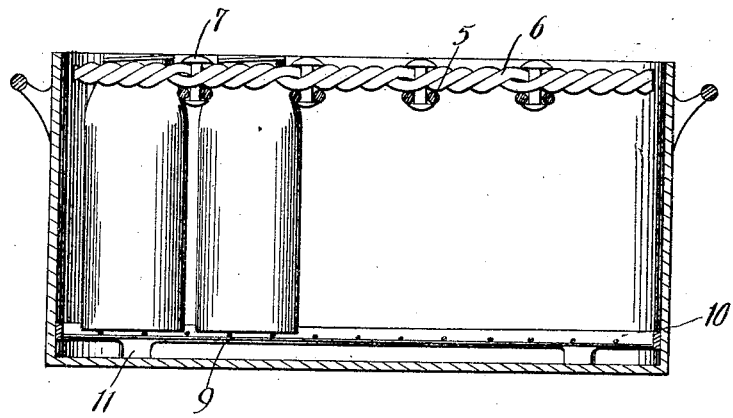
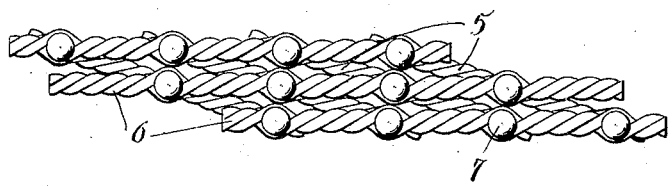
Inventor
Esther A. Vandenburgh
Witnesses
By
Chandler & Chandler
Attorneys

UNITED STATES PATENT OFFICE.

ESTHER A. VANDENBURGH, OF RIDLONVILLE, MAINE.

FRUIT-JAR HOLDER.

955,231.  Specification of Letters Patent.  Patented Apr. 19, 1910.

Application filed September 14, 1909. Serial No. 517,714.

*To all whom it may concern:*

Be it known that I, ESTHER A. VANDENBURGH, a citizen of the United States, residing at Ridlonville, in the county of Oxford, State of Maine, have invented certain new and useful Improvements in Fruit-Jar Holders; and I do hereby declare the following to be a full, clear, and exact description of the invention, such as will enable others skilled in the art to which it appertains to make and use the same.

This invention relates to improvements in fruit jar holders and has particular reference to a holder designed to be inserted into a cooking vessel and when so positioned to hold a plurality of fruit jars arranged in said vessel, in spaced relation.

One object of the invention is the provision of a collapsible holder which may be folded into a comparatively small compass when not in use.

Another object is the provision of a holder adapted to engage the upper ends or the bulged portion of the fruit jars to be held.

With these and other objects in view as will more fully hereinafter appear, the present invention consists in certain novel details of construction and arrangement of parts, hereinafter fully described, illustrated in the accompanying drawings and more particularly pointed out in the appended claim; it being understood that various changes in the form, proportion, size and minor details of the device may be made without departing from the spirit or sacrificing any of the advantages of the invention.

In the accompanying drawings forming part of the specification:—Figure 1 is a plan view of a cooking vessel showing a plurality of jars arranged therein and my holder applied thereto. Fig. 2 is a vertical sectional view of the same. Fig. 3 is a detailed plan of the holder when in folded position.

Similar numerals of reference are employed to designate corresponding parts throughout.

As shown in Figs. 1 to 3 inclusive the holder consists of a plurality of strips 5. These strips are each preferably formed of two pieces of thick wire, twisted one upon the other throughout their lengths. The lengths of the strips will be governed by the size of the vessel used for preserves and likewise the number of strips will be governed by the size of the vessel. The strips 5 are, adjacent their opposite ends and at their intermediate portions, spread apart, whereby openings are formed. The strips 5 are held spaced by a plurality of strips 6 arranged transverse the first-named strips 5. The second series of strips, like the first-named series, are formed of wire and twisted like the strips 5. In the construction illustrated in Fig. 1 four strips are used in the first series while three are used in the second series, and each strip in the latter series has its wires adjacent the opposite ends and intermediate portions spread apart to form openings adapted to aline with the openings in the strips of the first series. These alining openings receive pivot pins 7, which serve to unite the strips and permit the strips of both sections to be folded substantially parallel with each other.

Reference now to Fig. 1 discloses the fact that the intermediate strip of the second series is somewhat longer than the strips in either series, and its length corresponds to the diameter of the vessel used for cooking, or approximately so. The function of this elongated intermediate strip, is to prevent movement of the holder when the latter is positioned on the jars. The rectangular openings formed by the strips will be sufficient to receive the upper ends of the bulged portions of the jars and the latter when positioned in the openings will be positively prevented from movement toward each other, said movement being imparted to the jars by the action of the boiling water in the vessel.

As shown in Fig. 1 a tray or stand is preferably used in connection with the device and is designed to hold the jars spaced from the bottom of the vessel. In the present instance this tray or stand is preferably formed of wire netting designated by the numeral 9 and shaped to correspond to the cooking vessel. The outer edge of the body portion 9 is bounded by a metallic rib 10, which serves to strengthen the mesh and depending from opposite points of the rim 10 are supporting legs 11, which serve to hold the tray and the jars spaced from the bottom of the vessel. With this construction it is obvious that fruit jars may be placed in boiling water without any danger of the jars striking against each other and becoming broken.

It will be further observed that the device is exceedingly simple in structure and comparatively inexpensive to manufacture and may be readily applied to any form of vessel used for cooking preserved fruit.

What is claimed as new, is:—

A foldable fruit jar holder comprising a plurality of spaced parallel rods, each of said rods being formed of a double thickness of wire provided adjacent its opposite ends and intermediate portions with openings, a second series of spaced parallel rods arranged transverse the first-named series and having openings adjacent their opposite ends and intermediate portions to aline with the openings of the first-named series and pivot pins insertible through said alining openings.

In testimony whereof, I affix my signature, in presence of two witnesses.

ESTHER A. VANDENBURGH.

Witnesses:
EDITH ALLAN VANDENBURGH,
CAROLYN KENNSTON.